(12) United States Patent
Kim

(10) Patent No.: US 11,333,373 B2
(45) Date of Patent: May 17, 2022

(54) AIR CONDITIONING ROBOT AND AIR CONDITIONING SYSTEM INCLUDING THE SAME

(71) Applicant: LG ELECTRONICS INC., Seoul (KR)

(72) Inventor: Seongjae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 16/641,798

(22) PCT Filed: Dec. 26, 2018

(86) PCT No.: PCT/KR2018/016668
§ 371 (c)(1),
(2) Date: Feb. 25, 2020

(87) PCT Pub. No.: WO2019/139285
PCT Pub. Date: Jul. 18, 2019

(65) Prior Publication Data
US 2020/0355379 A1 Nov. 12, 2020

(30) Foreign Application Priority Data

Jan. 11, 2018 (KR) .................... 10-2018-0004038

(51) Int. Cl.
*F24F 5/00* (2006.01)
*F28D 20/00* (2006.01)
(Continued)

(52) U.S. Cl.
CPC ............ *F24F 5/0007* (2013.01); *F24F 11/62* (2018.01); *F28D 20/0034* (2013.01);
(Continued)

(58) Field of Classification Search
CPC .......... F28D 20/0034; F28D 2020/0026; F24F 5/0017; F24F 5/0021; F24F 2221/125; F24F 1/04; F24F 2221/42; Y02E 60/14
See application file for complete search history.

(56) References Cited

U.S. PATENT DOCUMENTS 5,005,368 A * 4/1991 MacCracken ........... F24F 1/022
62/139
8,181,470 B2 * 5/2012 Narayanamurthy .... F25D 16/00
62/113
(Continued)

FOREIGN PATENT DOCUMENTS

| JP | 5-203195 A | 8/1993 |
| JP | 2005-201574 A | 7/2005 |

(Continued)

OTHER PUBLICATIONS

International Search Report, issued in PCT/KR2018/016668, dated Apr. 8, 2019.

*Primary Examiner* — Lionel Nouketcha
(74) *Attorney, Agent, or Firm* — Birch, Stewart, Kolasch & Birch, LLP

(57) ABSTRACT

An air conditioning robot according to an embodiment of the present disclosure includes: a main body having a suction hole and a discharge hole; a cooling cycle including a compressor, a condenser, an expansion mechanism, and an evaporator, which are disposed within the main body; a blower fan configured to blow air suctioned through the suction hole so that the air is heat-exchanged with the evaporator and discharged through the discharge hole; a heat storage tank configured to accommodate a heat storage material in which heat of the condenser is stored; a heat dissipation part configured to dissipate the heat of the heat storage material accommodated in the heat storage tank, the heat dissipation part thermally contacting a heat transfer (Continued)

terminal disposed outside the main body; and a driving part configured to allow the main body to move so that the heat dissipation part thermally contacts or is thermally separated from the heat transfer terminal.

19 Claims, 8 Drawing Sheets

(51) Int. Cl.
    *F24F 120/12*     (2018.01)
    *F24F 140/20*     (2018.01)
    *F24F 11/62*     (2018.01)

(52) U.S. Cl.
    CPC ... *F24F 2005/0025* (2013.01); *F24F 2120/12* (2018.01); *F24F 2140/20* (2018.01); *F24F 2221/125* (2013.01)

(56) References Cited

U.S. PATENT DOCUMENTS

| | | | |
|---|---|---|---|
| 9,606,586 B2 * | 3/2017 | Rubenstein | G06F 1/20 |
| 2019/0072293 A1 * | 3/2019 | Kim | H04M 1/72412 |

FOREIGN PATENT DOCUMENTS

| | | |
|---|---|---|
| KR | 10-2003-0000482 A | 1/2003 |
| KR | 10-2011-0073764 A | 6/2011 |
| KR | 10-2017-0132378 A | 12/2017 |

* cited by examiner

AIR CONDITIONING ROBOT AND AIR CONDITIONING SYSTEM INCLUDING THE SAME

CROSS REFERENCE TO RELATED APPLICATIONS

This application is the National Phase of PCT International Application No. PCT/KR2018/016668, filed on Dec. 26, 2018, which claims priority under 35 U.S.C. 119(a) to Patent Application No. 10-2018-0004038, filed in the Republic of Korea on Jan. 11, 2018, all of which are hereby expressly incorporated by reference into the present application.

TECHNICAL FIELD

The present disclosure relates an air conditioning robot and an air conditioning system including the same, and more particularly, to an air conditioning robot that is disposed in an air conditioning space to performs air conditioning and an air conditioning system including the same.

BACKGROUND ART

In general, an air conditioner is a device for varying a temperature of an indoor space by a heat exchange action of a refrigerant that repeatedly performs a cycle of compression-condensation-expansion-evaporation and is divided into an indoor unit and an outdoor unit.

The outdoor unit includes a compressor and a condenser. Since the outdoor unit generates relatively high heat during a cooling operation, the outdoor unit is mainly fixed and installed at the outdoor. Also, the indoor unit is fixed and installed in the air conditioning space to discharge cold air to an indoor space through the evaporator.

Thus, in the stationary air conditioner according to the prior art, the outdoor unit and the indoor unit are connected to each other at a fixed position through a pipe to circulate the refrigerant. Thus, there are problems in that difficulty in installation and an increase in installation cost occur.

To solve the problems of the prior art, a mobile air conditioner has been researched and developed to be commercialized.

The mobile air conditioner is increasing in demand due to advantages of mobility and installation cost and also is being continuously researched and developed.

However, the mobile air conditioner according to the related art has a limitation in that it is impossible to discharge heat to the outside of the building, cooling performance disappears after a short time because the cooling is performed by using a temporary heat storage device such as a cold storage pack, and there is very inconvenient because the cold storage pack has to be cooled again after manually putting the cold storage pack into a freezer.

Also, the mobile air conditioner using the cooling cycle also has a problem in that condensed water of the evaporator is evaporated in the condenser to release heat, and thus, the heat is inevitably released again to the indoor space to increase again in temperature humidity of the indoor space.

PRIOR ART DOCUMENT

[Patent Document]
KR 10-1593657 B1 (Date of Registration: Feb. 12, 2016)

DISCLOSURE OF THE DISCLOSURE

Technical Problem

An object of the present disclosure is to provide an air conditioning robot that moves in an air conditioning space to performs air conditioning and an air conditioning system including the same.

Another object of the present disclosure is to provide an air conditioning robot, in which heat generated due a condensation load is released to an outdoor space without being released to an air conditioning space, and an air conditioning system including the same.

Further another object of the present disclosure is to provide an air conditioning robot, in which heat is automatically released, and an air conditioning system including the same.

Technical Solution

An air conditioning robot according to an embodiment of the present disclosure includes: a main body having a suction hole and a discharge hole; a cooling cycle including a compressor, a condenser, an expansion mechanism, and an evaporator, which are disposed within the main body; a blower fan configured to blow air suctioned through the suction hole so that the air is heat-exchanged with the evaporator and discharged through the discharge hole; a heat storage tank configured to accommodate a heat storage material in which heat of the condenser is stored; a heat dissipation part configured to dissipate the heat of the heat storage material accommodated in the heat storage tank, the heat dissipation part thermally contacting a heat transfer terminal disposed outside the main body; and a driving part configured to allow the main body to move so that the heat dissipation part thermally contacts or is thermally separated from the heat transfer terminal.

The air conditioning robot may further include a heat pipe that is connected to each of the heat storage tank and the heat dissipation part to transfer the heat stored in the heat storage tank to the heat dissipation part.

The air conditioning robot may further include: a temperature sensor disposed in the heat storage tank; and a controller configured to control the driving part so that the heat dissipation part thermally contacts a heat absorption part when a temperature measured by the temperature sensor is higher than a preset temperature.

The air conditioning robot may further include: a human recognition sensor configured to recognize a position of a human; and a controller configured to control the driving part so as to receive a signal of the human recognition sensor, thereby tracing a moving path of the human.

The heat dissipation part may be disposed on an outer surface of the main body.

An air conditioning system according to an embodiment of the present disclosure includes: an outdoor unit including a first compressor and a first condenser: a heat transfer terminal comprising a first evaporator connected to the first compressor and the first condenser and a heat absorption part that is heat-exchanged with the first evaporator; and an air conditioning robot that separably thermally contacts the heat absorption part of the heat transfer terminal. The air conditioning robot may include: a main body having a suction hole and a discharge hole; a cooling cycle including a second compressor, a second condenser, a second expansion mechanism, and a second evaporator, which are disposed within the main body; a blower fan configured to blow air suctioned through the suction hole so that the air is heat-exchanged with the second evaporator and discharged through the discharge hole; a heat storage tank configured to accommodate a heat storage material in which heat of the second condenser is stored; a heat dissipation part configured to dissipate the heat of the heat storage material accommodated in the heat storage tank, the heat dissipation part thermally contacting the heat absorption part; and a driving part configured to allow the main body to move so that the heat dissipation part thermally contacts or is thermally separated from the heat absorption part.

A power supply terminal configured to supply power may be provided on the heat transfer terminal, and a charging terminal connected to the power supply terminal when the heat dissipation part may thermally contact the heat absorption part is provided on the air conditioning robot.

The air conditioning robot may further include a heat pipe that is connected to each of the heat storage tank and the heat dissipation part to transfer the heat stored in the heat storage tank to the heat dissipation part.

The air conditioning robot may further include: a temperature sensor disposed in the heat storage tank; and a controller configured to control the driving part so that the heat dissipation part thermally contacts the heat absorption part when a temperature measured by the temperature sensor is higher than a preset temperature.

A position signal generation device may be provided in the heat transfer terminal, and an external signal detection sensor configured to receive a signal transmitted from the position signal generation device may be provided in the air conditioning robot.

The controller may turn on the first compressor when the heat absorption part contacts the heat dissipation part.

The heat transfer terminal may further include: a terminal body in which the first evaporator is disposed, the terminal body having a terminal suction hole and a terminal discharge hole; and a terminal blower fan configured to blow air suctioned through the terminal suction hole so that the air is heat-exchanged with the first evaporator and discharged through the terminal discharge hole.

The heat transfer terminal may further include a terminal heat pipe connected to each of the heat absorption part and the first evaporator to transfer heat of the absorption part to the first evaporator.

The heat transfer terminal may further include: a terminal heat pipe connected to the heat absorption part; and a terminal heat storage tank in which heat transferred to the terminal heat pipe is stored, the terminal heat storage tank being configured to accommodate a heat storage material that is heat-exchanged with the first evaporator.

The heat absorption part may be provided in plurality.

The heat transfer terminal may further include a heat insulation case that surrounds the terminal heat storage tank.

A first uneven part may be disposed on the heat absorption part, and a second uneven part which contacts the first uneven part when the heat absorption part contacts the heat dissipation part and has a shape corresponding to that of the first uneven part may be disposed on the heat dissipation part.

The heat absorption part may be disposed in an air conditioning space in which the air conditioning robot is disposed.

An air conditioning robot according to another embodiment of the present disclosure includes: a main body having a suction hole and a discharge hole; a cooling cycle including a compressor, a condenser, an expansion mechanism, and an evaporator, which are disposed within the main body; a blower fan configured to blow air suctioned through the suction hole so that the air is heat-exchanged with the evaporator and discharged through the discharge hole; a heat storage tank configured to accommodate a heat storage material in which heat of the condenser is stored; a heat pipe having a high temperature portion that contacts the heat storage material accommodated in the heat storage tank and a low temperature portion to which heat of the high temperature portion is transferred; a heat dissipation fan configured to blow air so that the air is heat-exchanged with the low temperature portion; a heat dissipation discharge part through which the air blown by the heat dissipation fan is discharged, the heat dissipation discharge part being separably connected to a heat dissipation duct configured to allow an air conditioning space to communicate with an outdoor space; and a driving part configured to allow the main body to move so that the heat dissipation discharge part is connected to or separated from the heat dissipation duct.

A heat dissipation suction hole which is spaced apart from the suction hole and the discharge hole and through which the air is suctioned by the heat dissipation fan may be defined in the main body.

Advantageous Effects

According to the preferred embodiment of the present disclosure, the air conditioning robot may include the driving part to perform the air conditioning while moving in the air conditioning space (indoor space). Thus, the air conditioning space (indoor space) may be uniformly cooled as a whole, and also, the place at which a large cooling load is required such as a kitchen may be intensively cooled.

Also, the heat dissipation part of the air conditioning robot may thermally contact the heat absorption part of the heat transfer terminal to perform the dissipation of the heat, which is generated by the condensation load of the air conditioning robot, without being released to the air conditioning space (indoor space). Thus, the temperature of the air conditioning space (indoor space) may be maintained comfortably without increasing again.

Also, the heat storage material of the heat storage tank may store the heat of the condenser to prevent the air conditioning time of the air conditioning robot from increasing and prevent the frequent thermal contact between the air conditioning robot and the heat transfer terminal from occurring.

Also, since the heat pipe of the air conditioning robot is connected to each of the heat storage tank and the heat dissipation part, the heat exchange between the heat storage tank and the heat dissipation part may be performed quickly.

Also, the controller may determine the degree of heat storage by sensing the temperature measured by the temperature sensor of the heat storage tank, and when the heat storage reaches the reference value, the controller may control the driving part to thermally contact the air conditioning robot and the heat transfer terminal. Thus, the heat dissipation may be automatically performed to improve the user convenience.

Also, the controller may control the driving part to track the moving path of the person by receiving the signal from the human recognition sensor. Thus, the air conditioning robot may discharge the cold air while following the user. As a result, the user may continuously feel comfortable.

Also, the heat transferred from the air conditioning robot to the heat transfer terminal may be released to the outside by the cooling cycle disposed in the outdoor unit and the heat transfer terminal. Thus, the heat dissipation of the air conditioning robot may be performed quickly.

Also, when the air conditioning robot and the heat transfer terminal thermally contact each other, the power supply terminal of the heat transfer terminal and the charging terminal of the air conditioning robot may be connected to each other. Thus, the heat dissipation and the charging of the air conditioning robot may be performed at the same time, and also, a separate charging operation may not be required.

Also, the terminal heat storage tank may be provided in the heat transfer terminal to serve as the heat transfer buffer. Thus, the number of times of driving of the cooling cycles of the outdoor unit and the heat transfer terminal may decrease to reduce the energy consumption.

Also, since the plurality of heat absorption parts are provided in the heat transfer terminal, the plurality of air conditioning robots may perform the heat dissipation at the same time.

Also, the uneven parts which contact each other, may be disposed on the heat absorption part of the heat transfer terminal and the heat dissipation part of the air conditioning robot, respectively. Thus, the contact area between the heat absorption part and the heat dissipation part may increase to more quickly perform the heat transfer.

Also, the heat dissipation fan may be provided within the air conditioning robot without providing the outdoor unit and the heat transfer terminal and be connected to the heat dissipation duct through which the air conditioning robot allows the air conditioning space and the outdoor space to communicate with each other. Thus, the hot air may be blown directly to the outside to dissipate the heat, and the configuration of the air conditioning system may be simplified.

MODE FOR CARRYING OUT THE DISCLOSURE

Hereinafter, detailed embodiments of the present disclosure will be described in detail with reference to the accompanying drawings.

Figure 1:
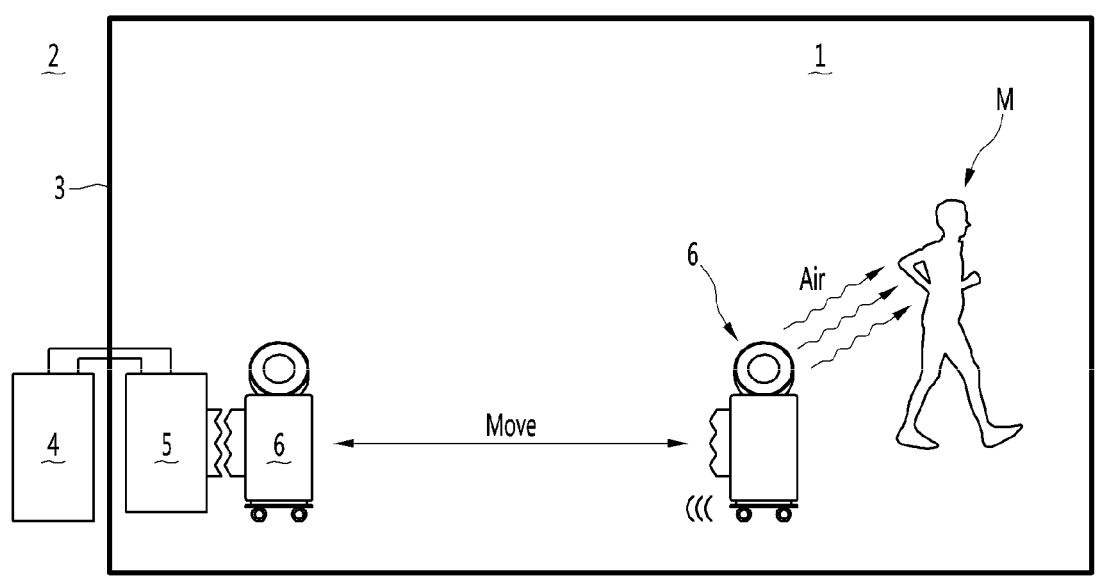
FIG. 1 is a schematic view of an air conditioning system according to a first embodiment of the present disclosure.
Figure 2:
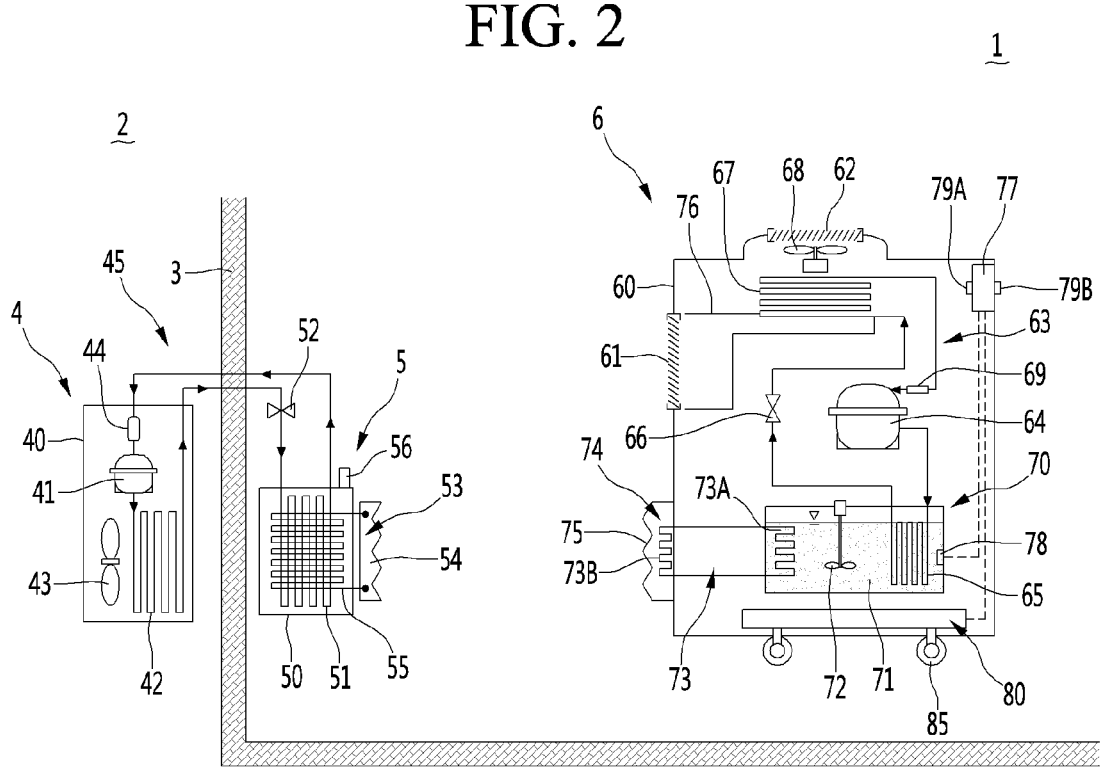
FIG. 2 is a view illustrating a configuration of the air conditioning system according to the first embodiment of the present disclosure.
Figure 3:
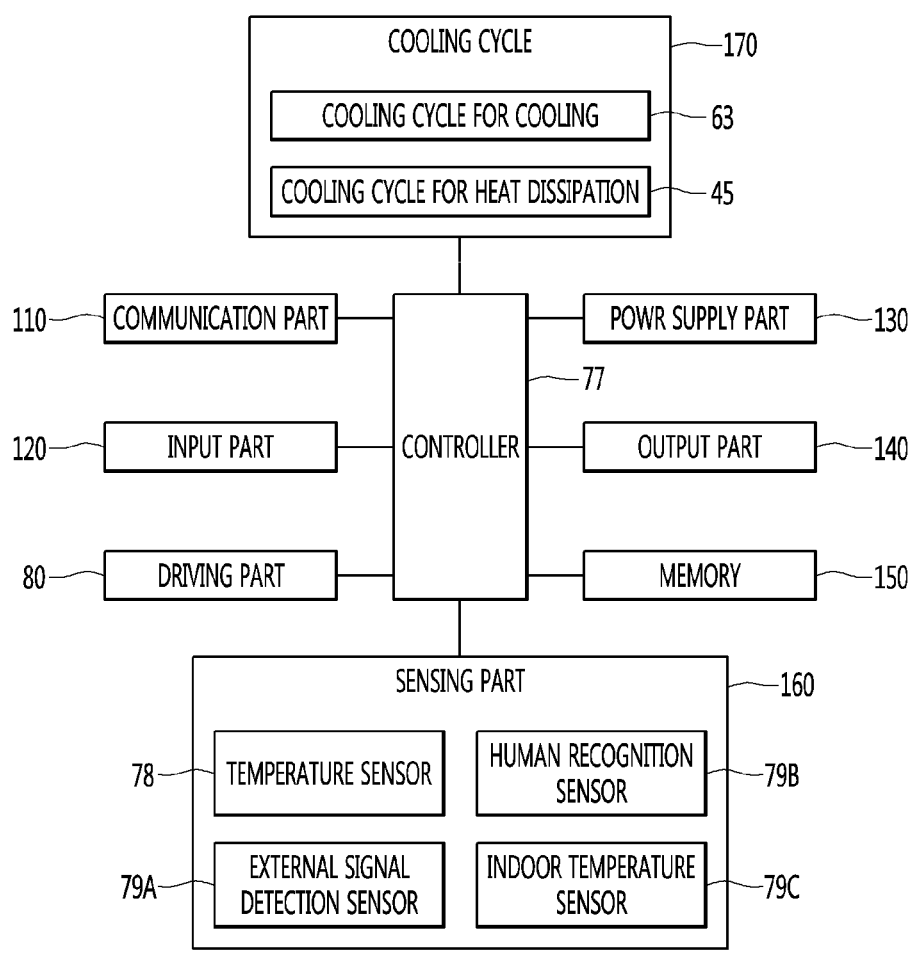
FIG. 3 is a block diagram illustrating a control of the air conditioning system according to the first embodiment of the present disclosure.

FIG. 1 is a schematic view of an air conditioning system according to a first embodiment of the present disclosure, FIG. 2 is a view illustrating a configuration of the air conditioning system according to the first embodiment of the present disclosure, and FIG. 3 is a block diagram illustrating a control of the air conditioning system according to the first embodiment of the present disclosure.

An air conditioning system according to this embodiment includes an air conditioning robot 6 which moves in an air conditioning space 1 to perform air conditioning, a heat transfer terminal 5 which separably thermally contacts the air conditioning robot 6, and an outdoor unit 4 connected to the heat transfer terminal 5 and disposed in an outdoor space 2. The heat transfer terminal 5 is preferably disposed in the indoor space 1, and a pipe connecting the heat transfer terminal 5 to the outdoor unit 4 may pass through an installation wall 3.

The outdoor unit 4 may include an outdoor body 40, a first compressor 41, a first condenser 42, and an outdoor fan 43. Also, the heat transfer terminal 5 may include a terminal body 50, a first evaporator 51, and a heat absorption part 53. The heat transfer terminal 5 may further include a terminal heat pipe 55.

The outdoor body 40 may define an outer appearance of the outdoor unit 4, and the first compressor 41, the first condenser 42, and the outdoor fan 43 may be disposed within the outdoor body 40. A suction hole (not shown) and a discharge hole (not shown) may be defined in the outdoor body 40.

Also, the terminal body 50 may form an appearance of the heat transfer terminal 5, and the first condenser 42 may be disposed within the terminal body 50.

The heat absorption part 53 may be disposed outside the terminal body 50. The heat absorption part 53 may thermally contact the heat dissipation part 74, which will be described later, of the air conditioning robot 6.

The heat absorption part 53 may be made of a metal material having high thermal conductivity.

The heat absorption part 53 may be heat-exchanged with the first evaporator 51. In more detail, the terminal heat pipe 55 may be connected to each of the heat absorption part 53 and the first evaporator 51 to transfer the heat of the heat absorption part 53 to the first evaporator 51. For example, the first evaporator 55 may be provided as a plate heat exchanger, and the terminal heat pipe 55 may be mounted on the plate heat exchanger.

Since the heat transfer material is phase-changed and circulated within the terminal heat pipe 55, heat conduction may be quickly performed.

However, the heat transfer terminal 5 may not include the terminal heat pipe 55, a heat sink including a plurality of fins may be disposed on the heat absorption part 53, and the heat sink may be directly heat-exchanged with the first evaporator 51.

The first evaporator 51 may be connected to each of the first compressor 41 and the first condenser 42.

A first expansion mechanism 52 may be installed in a pipe connecting the first condenser 42 to the first evaporator 51. The first expansion mechanism 52 may be disposed within the outdoor main body 40, disposed within the terminal main body 50, or disposed outside the outdoor main body 40 and the terminal main body 50 as illustrated in FIG. 2.

A dryer 44 may be installed in a pipe connecting the first evaporator 51 to the first compressor 41. The dryer 44 may prevent a liquid refrigerant from being suctioned into the first compressor 41.

The outdoor fan 43 may be disposed to face the first condenser 42. The air suctioned into the suction hole defined in the outdoor body 40 may be blown to the first condenser 42 by the outdoor fan 43 so as to be heat-exchanged with the first condenser 42 and then may be discharged to the discharge hole defined in the outdoor body 40.

The first compressor 41, the first condenser 42, the first expansion mechanism 52, and the first evaporator 51 may constitute a cooling cycle 45 for the heat dissipation.

The refrigerant compressed by the first compressor 41 may flow into the first condenser 42 and may be heat-exchanged with the air blown by the outdoor fan 43 so as to be condensed. The condensed refrigerant may be expanded in the first expansion mechanism 52 to flow to the first evaporator 51 and may be evaporated by heat transferred from the heat absorption part 53 through the terminal heat pipe 55. Thereafter, the refrigerant may be suctioned into the first compressor 41 to repeatedly perform the above processes so as to be circulated in the cooling cycle 45 for the heat dissipation. The heat transferred into the heat absorption part 53 of the heat transfer terminal 5 may be quickly released to the outdoor space by the circulation of the refrigerant.

the air conditioning robot 6 may be referred to as a mobile indoor device.

The air conditioning robot 6 may include a main body 60, a cooling cycle 63 for cooling, a blower fan 68, a heat storage tank 70, a heat dissipation part 74, and a driving part 80. The air conditioning robot 6 may further include a heat pipe 73.

The main body 60 may define an outer appearance of the air conditioning robot 6. The suction hole 61 and the discharge hole 62 may be defined in the main body 60.

The cooling cycle 63 for the cooling may include a second compressor 64, a second condenser 65, a second expansion mechanism 66, and a second evaporator 67. The second compressor 64, the second condenser 65, the second expansion mechanism 66, and the second evaporator 67 may be disposed within the main body 60.

The second evaporator 67 may be connected to each of the second compressor 64 and the second condenser 65. The second expansion mechanism 66 may be installed in a pipe connecting the second condenser 65 to the second evaporator 67. A dryer 69 may be installed in a pipe connecting the second evaporator 67 to the second compressor 64. The dryer 69 may prevent the liquid refrigerant from being suctioned into the second compressor 64.

The refrigerant compressed by the second compressor 64 may flow into the second condenser 65 and be condensed by being heat-exchanged with a heat storage material 71 contained in the heat storage tank 70. The condensed refrigerant may be expanded in the second expansion mechanism 66 to flow to the second evaporator 67 and be evaporated by being heat-exchanged with the air blown by the blower fan 68. Thereafter, the refrigerant may be suctioned into the second compressor 64 to repeatedly perform the above processes so as to be circulated in the cooling cycle.

The blower fan 68 may be disposed to face the second evaporator 67.

The blower fan 68 may blow air suctioned into the suction hole 61 so as to be heat-exchanged with the second evaporator 67 and then be discharged to the discharge hole 62. In more detail, the air suctioned into the suction hole 61 may be guided to the second evaporator 67 through the guide duct 76, be heat-exchanged with the second evaporator 67 so as to be cooled, and be discharged to the discharge hole 62. Thus, the air conditioning space 1 may be cooled.

The heat storage tank 70 may accommodate the heat storage material 71 in which the heat of the second condenser 65 is stored. The heat storage tank 70 may include a heat insulation case (not shown) to prevent the heat stored in the heat storage material 71 from being released to the surroundings. The heat storage material 71 is preferably paraffin, but is not limited thereto.

The second condenser 65 may be disposed within the heat storage tank 70. At least a portion of the second condenser 65 may be immersed in the heat storage material 71 of the heat storage tank 70.

An agitator 72 may be provided in the heat storage tank 70. The agitator 72 may agitate the heat storage material 71 to promote convective heat transfer in the heat storage tank 70.

The heat dissipation part 74 may dissipate heat of the heat storage material 71, which is stored in the heat storage tank 70. In more detail, the heat pipe 73 may be connected to each of the heat storage tank 70 and the heat dissipation part 74 to transfer the heat stored in the heat storage tank 70 to the heat dissipation part 74.

The heat dissipation part 74 may be made of a metal material having high thermal conductivity. The heat dissipation part 74 may include a heat dissipation plate.

Since the heat transfer material is phase-changed and circulated in the heat pipe 73, heat conduction may be quickly performed. In more detail, a high temperature portion 73A of the heat pipe 73 may be immersed in the heat storage material 71, and the heat transfer material may be evaporated in the high temperature portion 73A. The evaporated heat transfer material may move to a low temperature portion 73B that contacts the heat dissipation part 74 due to a density difference and may be condensed in the low temperature portion 73B.

However, the air conditioning robot 6 may not include the heat pipe 73, a heat sink including a plurality of fins may be disposed on the heat dissipation part 74, and the heat sink may be directly heat-exchanged with the heat storage material 71.

The heat dissipation part 74 may be disposed on an outer surface of the main body 60 or may be disposed to be exposed to the outside of the main body 60.

The heat dissipation part 74 may thermally contact the heat absorption part 53 of the heat transfer terminal 5. When the heat dissipation part 74 and the heat absorption part 53 thermally contact each other, the heat of the heat dissipation part 74 may be conducted to the heat absorption part 53. That is, the heat transferred from the heat storage tank 70 of the air conditioning robot 6 to the heat dissipation part 74 through the heat pipe 73 may be conducted to the heat absorption part 53 of the heat transfer terminal 5 and then be released from the outdoor unit 4 to the outdoor space by the above-described cooling cycle 45 for the heat dissipation.

The first uneven part 54 may be disposed on the heat absorption part 53 of the heat transfer terminal 5, and the second uneven part 75 may be disposed on the heat dissipation part 74 of the air conditioning robot 6. The first uneven part 54 and the second uneven part 75 may have shapes corresponding to each other, and when the heat absorption part 53 and the heat dissipation part 74 thermally contact each other, the first uneven part 54 and the second uneven part 75 may contact each other. A contact area between the heat absorption part 53 and the heat dissipation part 74 may be widened by the uneven parts 75 to more quickly perform the heat transfer.

Figure 5:
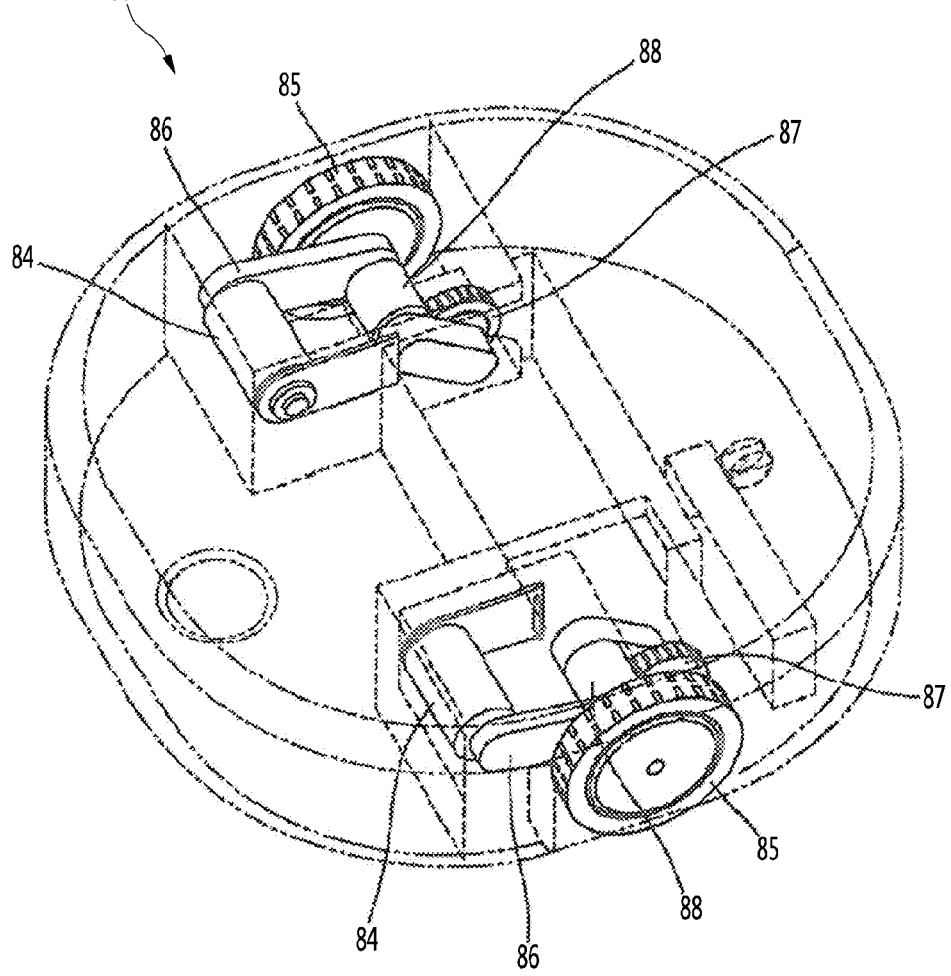
FIG. 5 is a view illustrating the inside of the driving part of FIG. 4.

The driving part 80 includes a motor 84 (see FIG. 5). Thus, the motor may be driven to allow a main wheel 85 to rotate bidirectionally so that the main body 60 rotates or moves. The driving part 80 may allow the air conditioning robot 6 to advance forward, backward, leftward, and rightward or to travel in a curved manner or rotate in place. The driving part 80 may allow the air conditioning robot 6 to move within the air conditioning space 1.

The driving part 80 may allow the air conditioning robot 6 to move away from the heat transfer terminal 5, thereby separating the heat dissipation part 74 from the heat absorption part 53 of the heat transfer terminal 5. On the contrary, the driving part 80 may allow the air conditioning robot 6 to move toward the heat transfer terminal 5 so that the heat dissipation part 74 thermally contacts the heat absorption part 53 of the heat transfer terminal 5. The detailed configuration of the driving part 80 will be described in detail later.

The air conditioning system may further include at least one of a controller 77, a communication part 110, the input part 120, a power supply part 130, an output part 140, a memory 150, or a sensing part 160, or a combination thereof.

The controller 77 may be provided in at least one of the outdoor unit 4, the heat transfer terminal 5, or the air conditioning robot 6. Hereinafter, the case in which the controller 77 is provided in the air conditioning robot 6 will be described as an example.

The power supply part 130 may include a battery that is chargeable by an external commercial power supply to supply power to the air conditioning robot 6. The power supply part 130 may supply driving power to each of the components provided in the air conditioning robot 6 to supply operation power that is required for the air conditioning robot 6 to travel or perform a specific function.

Here, the controller 77 may detect remaining power of the battery. If the remaining power is insufficient, the controller 77 controls the battery so that the battery moves to a charging stand connected to the external commercial power supply and receives charging current from the charging stand so as to be charged. The battery may be connected to a battery detector so that the remaining power and the charging state of the battery are transmitted to the controller 77. The output part 140 may display the remaining power of the battery on a screen by the control of the controller 77.

The battery may be disposed below a center of the air conditioning robot 6 or may be disposed on either of left and right sides. In the latter case, the air conditioning robot 6 may further include a counterweight to eliminate a weight bias of the battery.

The input part 120 may receive various control commands for the heat transfer terminal 5 and/or the air conditioning robot 6 from the user. The input part 120 may include one or more buttons. For example, the input part 120 may include a confirmation button, a setting button, and the like. The confirmation button may be a button for receiving a command for confirming detection information, obstacle information, location information, and map information from the user. The setting button may be a button for receiving a command for setting the information from the user.

Also, the input part 120 may include an input resetting button which cancels the previous input of the user and receiving a user input again, a delete button that deletes a preset user input, a button that sets or change an operation mode, and a button that receives a command for returning to the charging stand.

The input part 120 may be installed on the heat transfer terminal 5 and/or the air conditioning robot 6 as a hard key, a soft key, or a touch pad. The input part 120 may have the form of a touch screen together with the output part 150.

The output part 140 may be installed an upper portion of the heat transfer terminal 5 and/or the air conditioning robot 6. However, the present disclosure is not limited thereto, and the installation position or the installation form of the output part 140 may vary.

The output part 140 may display a battery state, a desired temperature, or a driving mode on the screen. The output part 140 may output state information detected by the sensing part 160, for example, a heat storage level of the heat storage tank 70. The output part 140 may output external state information, obstacle information, location information, map information, indoor temperature, and the like, which are detected by the sensing part 140. The output part 150 may be one of a light emitting diode (LED), a liquid crystal display (LCD), a plasma display panel, and an organic light emitting diode (OLED), but is not limited thereto.

The output part 140 may further include a sound output part for audibly outputting an operation process or an operation result of the heat transfer terminal 5 and/or the air conditioning robot 6, which is performed by the controller 77. For example, the output part 140 may output a warning sound to the outside according to a warning signal generated by the controller 77. Here, the sound output part may be a part that outputs a sound such as a beeper and a speaker, and the output part 140 may output the sound through the sound output part by using audio data, message data, or the like having a predetermined pattern stored in the memory 150.

Accordingly, the heat transfer terminal 5 and/or the air conditioning robot 6 may output environmental information about a traveling area on the screen or output the sound through the output part 140. Also, the heat transfer terminal 5 and/or the air conditioning robot 6 may transmit map information or environment information to the terminal device through the communication part 110 so that the terminal device outputs an image or sound to be outputted through the output part 140.

The communication part 110 may be connected to a terminal device and/or the other device disposed on a specific area in one manner of wired, wireless, and satellite communication manners to transmit and receive signals and data. The communication part 110 may transmit/receive data with other devices disposed on a specific area. Here, the other device may be used as the communication part 110 as long as the other device transmits and receives data by being connected to a network. For example, the other device may be a device such as the other air conditioner, a heating device, an air purifier, a lamp, a TV, a car, a cleaner, or the like. The other device may be a device that controls a door, a window, a water valve, a gas valve, or the like. The other device may be a sensor that detects a temperature, a humidity, a barometric pressure, a gas, or the like.

The communication part 110 may include a terminal communication part provided in the heat transfer terminal 5 and a unit communication part provided in the air conditioning robot 6. The terminal communication part and the unit communication part may communicate with each other and may also communicate with the other device.

The memory 150 may store control program for controlling or driving the air conditioning system and data corresponding thereto. The memory 150 may store audio information, image information, obstacle information, location information, map information, and the like. Also, the memory 150 may store information related to the traveling pattern and the control of the cooling cycle 170.

The memory 150 may use a non-volatile memory, but is not limited thereto. The non-volatile memory (NVM or NVRAM) may be a storage device that is capable of maintaining stored information even when power is not supplied. For example, the non-volatile memory may include a ROM, a flash memory, a magnetic computer memory (e.g., a hard disk, a diskette drive, a magnetic tape, and the like), an optical disk drive, a magnetic RAM, a PRAM, and the like.

The sensing part 160 may include a temperature sensor 78, an external signal detection sensor 79A, a human recognition sensor 79B, and an indoor temperature sensor 79C.

The temperature sensor 78 may measure a temperature of the heat storage tank 70 of the air conditioning robot 6. As an amount of heat stored in the heat storage material 71 increases, the measured temperature of the temperature sensor may increase. When the measured temperature of the temperature sensor 78 becomes higher than a preset heat dissipation setting temperature, this may mean that a heat storage level of the heat storage tank 70 reaches a heat storage limit. On the contrary, when the heat dissipation part 74 and the heat absorption part 53 thermally contact each other to release the heat stored in the heat storage material 71, the measured temperature of the temperature sensor 78 may decrease. When the measured temperature of the temperature sensor 78 decreases lower than a predetermined heat dissipation release setting temperature, this may mean that the heat storage level of the heat storage tank 70 is sufficiently lowered.

When the measured temperature of the temperature sensor 78 is higher than the predetermined heat dissipation setting temperature, the controller 77 may control the driving part 80 to allow the air conditioning robot 6 to approach the heat transfer terminal 5 and allow the heat dissipation part 74 to thermally contact the heat absorption part 53 of the heat transfer terminal 5.

The controller 77 may determine that the thermal contact between the heat dissipation part 74 and the heat absorption part 53 is realized when the measured temperature of the temperature sensor 78 is lowered at a rate greater than a predetermined rate.

When the measured temperature of the temperature sensor 78 is less than the predetermined heat dissipation release setting temperature, the controller 77 may control the driving part 80 to separate the heat dissipation part 74 from the heat absorption part 53 of the heat transfer terminal 5.

The external signal detection sensor 79A may detect an external signal of the air conditioning robot 6. The external signal detection sensor may include, for example, an infrared ray sensor, an ultrasonic sensor, an RF sensor, or the like.

The external signal detection sensor 79A may detect or receive a signal transmitted from a position signal generation device 56 of the heat transfer terminal 5, and the controller 77 may recognize a position and direction of the heat transfer terminal 5 by the signal detected by the external signal detection sensor 79A. That is, the controller 77 may determine a current position of the air conditioning robot 6 and set a moving direction by the signal transmitted from the position signal generation device 56. In addition, the controller 77 may control the driving part 80 to allow the air conditioning robot 6 to move to the heat transfer terminal 5. This may also be equally applied to the charging stand that is provided in the heat transfer terminal 5 or is separately provided.

The human recognition sensor 79B may recognize a person M moving into the air conditioning space 1. The human recognition sensor 79B may determine whether a moving object is the person M through the information previously stored in the memory 150.

The controller 77 may control the air conditioning robot 6 in a tracking mode. In the tracking mode, the controller 77 may receive a signal from the human recognition sensor 79B and control the driving part 80 so that the air conditioning robot 6 tracks a moving path of the person M. As a result, the air conditioning robot 6 may blow cold air while following the user, and the user may continuously feel comfortable.

The indoor temperature sensor 79C may measure the temperature of the indoor space, i.e., the air conditioning space 1. The indoor temperature sensor 79C may be disposed in the air conditioning robot 6 and/or the heat transfer terminal 5. The controller 77 may receive the indoor temperature measured by the indoor temperature sensor 79C and control the cooling cycle 63 for the cooling so that the temperature of the air discharged from the air conditioning robot 6 is less than the indoor temperature. The controller 77 may control the cooling cycle 63 for the cooling so that the temperature of the air discharged from the air conditioning robot 6 decreases as a different between the desired temperature inputted through the input part 120 by the user and the indoor temperature increases.

Also, the sensing part 160 may further include at least one of an obstacle detection sensor, a cliff detection sensor, a lower camera sensor, or an upper camera sensor.

The obstacle detection sensor may be installed in the air conditioning robot 6. The obstacle detection sensor is disposed on the outer surface of the air conditioning robot 6 to detect an obstacle that is disposed at the front or lateral side. In more detail, the obstacle detection sensor may detect an object existing in the moving direction of the air conditioning robot 6, in particular, an obstacle to transmit detection information to the controller 77. That is, the obstacle detection sensor may detect a protrusion object existing on the moving path of the air conditioning robot 6, household appliances, furniture, walls, wall edges, and the like to transmit the detected information to the controller 77.

The obstacle detection sensor may include an infrared sensor, an ultrasonic sensor, an RF sensor, a geomagnetic sensor, and the like. The air conditioning robot 6 may use one type of sensor or two or more types of sensors as the obstacle detection sensor as necessary.

For example, the obstacle detection sensor may include the ultrasonic sensor. The ultrasonic sensors may be generally used mainly for detecting remote obstacles. The ultrasonic sensor includes a transmitter and a receiver, and the controller 77 determines whether an obstacle exists through whether the ultrasonic wave emitted through the transmitter is reflected by the obstacle or the like and received into the receiver. As a result, a distance from the obstacle may be calculated using an ultrasonic wave emitting time and an ultrasonic receiving time. Also, the controller 77 may detect information related to a size of the obstacle by comparing the ultrasound emitted from the transmitter with the ultrasound received from the receiver. For example, the controller 77 may determine that the obstacle has a large size when a more amount of ultrasonic waves is received in the receiver.

For another example, the obstacle detection sensor may include the infrared sensor. The infrared sensor may also detect an obstacle existing at the front or lateral side to transmit the obstacle information to the controller 77. The infrared detection sensor may detect a protrusion object existing on the moving path of the air conditioning robot 6, household appliances, furniture, walls, wall edges, and the like to transmit the detected information to the controller 77. Thus, the air conditioning robot 6 may move within a specific area without colliding with the obstacle.

The cliff detection sensor (or the cliff sensor) may mainly detect the floor supporting the air conditioning robot 6 and obstacles placed on the floor by using various types of optical sensors.

The cliff detection sensor may be installed on the bottom surface of the air conditioning robot 6, but is not limited thereto. The cliff detection sensor may include an infrared sensor having a light emitting part and a light receiving part, an ultrasonic sensor, an RF sensor, a position sensitive detector (PSD) sensor, or the like as the obstacle detection sensor.

For example, the cliff detection sensor may include the PSD sensor. The PSD sensor detects may be provided as one p-n junction to detect the short and long distance positions of incident light by using a semiconductor surface resistance. The PSD sensor may include a one-dimensional PSD sensor that detects light in only one axis direction and a two-dimensional PSD sensor that detects a light position on a plane, Here, each of the one-dimensional PSD sensor and the two-dimensional PSD sensor may have a pin photodiode structure. The PSD sensor may be a type of infrared sensor. The PDS sensor may use infrared rays to measure a distance by measuring an angle of the infrared rays reflected from the obstacle after transmitting the infrared rays. That is, the PSD sensor calculates a distance from the obstacle by using a triangulation method. The PSD sensor includes a light emitting part for emitting infrared rays to an obstacle and a light receiving part for receiving infrared rays reflected from the obstacle and may be generally provided in the form of a module. When the obstacle is detected using the PSD sensor, a stable measurement value may be obtained regardless of a difference in reflectance and color of the obstacle.

The controller 77 may detect a cliff and analyze a depth of the cliff by measuring an infrared angle between the infrared light emitted by the cliff detection sensor and the reflected signal received by the obstacle. The controller 77 may determine whether the cliff passes according to a ground condition of the cliff detected using the cliff detection sensor and determine whether the cliff passes according to the determination result. For example, the controller 77 determines whether the cliff exists and the depth of the cliff through the cliff detection sensor and then passes through the cliff only when the reflection signal is detected by the cliff detection sensor. Also, the controller 77 may determine a lifting phenomenon of the air conditioning robot 6 by using the cliff detection sensor.

The lower camera sensor may be provided in the air conditioning robot 6 to obtain image information on a lower side, i.e., the floor surface during the movement. The lower camera sensor may be referred to as an optical flow sensor.

The lower camera sensor may convert a lower image inputted from an image sensor provided in the sensor to generate image data having a predetermined format. The generated image data may be stored in the memory 150.

Also, at least one light source may be installed to be adjacent to the image sensor in the air conditioning robot 6, and the light source may emit light to a predetermined area of the floor surface photographed by the image sensor. In more detail, when the air conditioning robot 6 moves on a specific area along the floor surface, if the floor surface is flat, a constant distance may be maintained between the image sensor and the floor surface. On the other hand, when the air conditioning robot 6 moves on the floor surface having the non-uniform surface, the air conditioning robot 6 may move away by a predetermined distance due to unevenness and obstacles on the floor surface. Here, the controller 77 may adjust an amount of light emitted from the light source. The light source may include a light emitting element capable of adjusting an amount of light, for example, a light emitting diode (LED).

The controller 77 may detect a position of the air conditioning robot 6 regardless of sliding of the air conditioning robot 6 by using the lower camera sensor. The controller 77 may calculate a moving distance and the moving direction by comparing and analyzing the image data photographed by the lower camera sensor with a time to calculate the position of the air conditioning robot 6 on the basis of the analyzed results. Also, the controller 77 may control the driving part 80 to correspond to the slipping by using the image information on the lower side of the air conditioning robot 6, which is detected by the lower camera sensor.

The upper camera sensor may be installed to face an upper or front side of the air conditioning robot 6 to photograph the air conditioning robot 6. When the air conditioning robot 6 includes a plurality of upper camera sensors, the upper camera sensors may be disposed on a top or side surface of the air conditioning robot 6 at a predetermined distance or an angle.

The controller 77 may control the cooling cycle 170. The cooling cycle 170 may include the cooling cycle 63 for the cooling and the cooling cycle 45 for the heat dissipation, which are described above.

The cooling cycle 63 for the cooling may be disposed in the air conditioning robot 6, and the cooling cycle 45 for the heat dissipation may be disposed in the outdoor unit 4 and the heat transfer terminal 5.

The controller 77 may control the cooling cycle 63 for the cooling. In more detail, the controller 77 may control the cooling cycle 63 for the cooling according to an indoor temperature detected by the indoor temperature sensor 79C and a desired temperature inputted by the user through the input part 120. That is, the controller may control a temperature of cold wind discharged from the discharge hole of the air conditioning robot. Also, the controller 77 may control turn on/off and rotational rates of the blower fan 68 and the agitator 72.

Also, the controller 77 may control the cooling cycle 45 for the heat dissipation. In more detail, when the heat storage level of the heat storage tank 70 of the air conditioning robot 6 reaches the reference value so that the heat dissipation part 74 of the air conditioning robot 6 and the heat absorption part 53 of the heat transfer terminal 5 thermally contact each other, the controller 77 may turn on the first compressor 41, and the refrigerant may be circulated through the cooling cycle 45 for the heat dissipation to release heat of the heat absorption part 53 to the outside. Also, the controller 77 may control turn on/off and a rotational rate of the outdoor fan 43.

Figure 4:
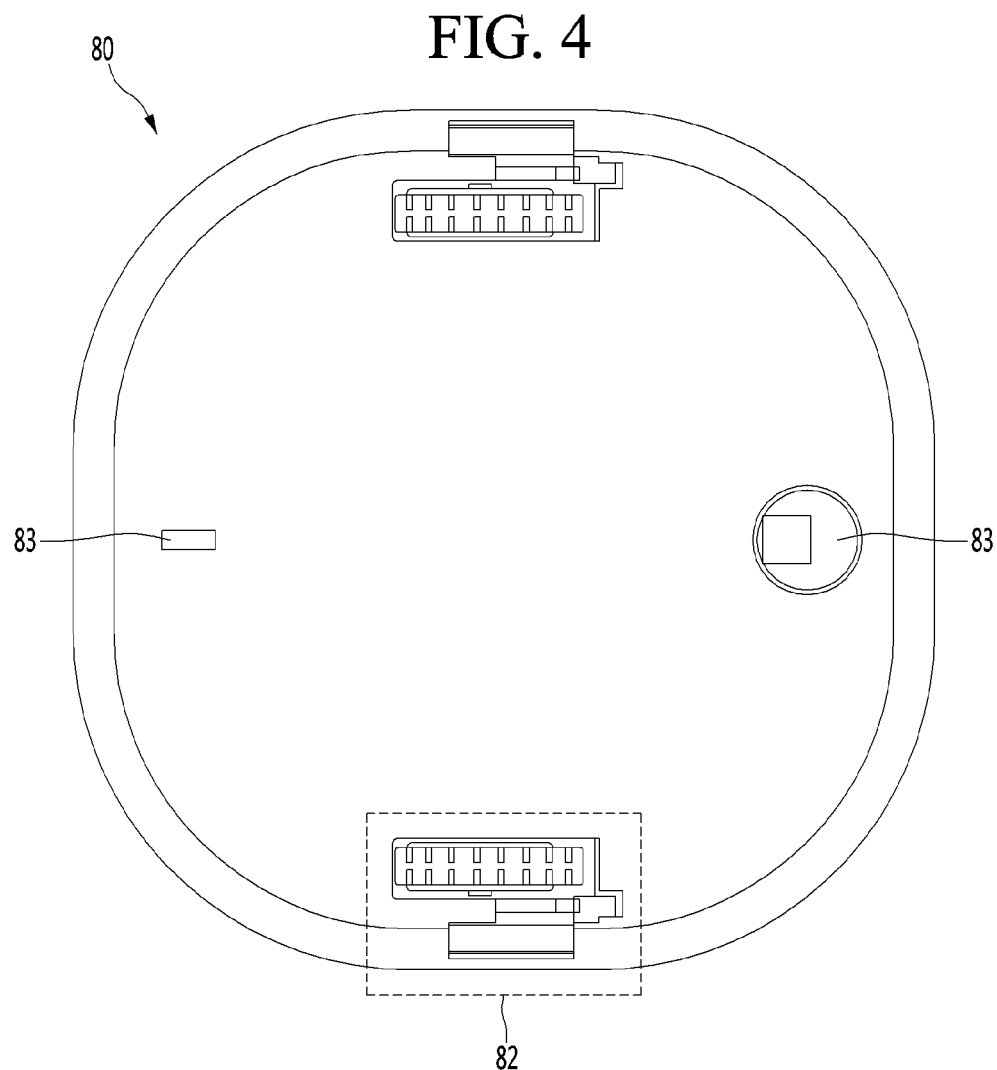
FIG. 4 is a bottom view illustrating an example of a driving part of an air conditioning robot.

FIG. 4 is a bottom view illustrating an example of the driving part of the air conditioning robot, and FIG. 5 is a view illustrating the inside of the driving part of FIG. 4.

The configuration of the driving part 80 may vary as necessary. Hereinafter, the configuration of the driving part 80 according to an embodiment will be described below.

The driving part 80 may include at least one driving wheel 82 and at least one auxiliary wheel 83. For example, the driving part 80 may include a pair of driving wheels 82 and a pair of auxiliary wheels 83. The driving wheels 82 and the auxiliary wheels 83 protrude to a lower side from the bottom surface of the main body 60 (see FIG. 2).

The driving wheel 82 may operate by the driving force of the motor 84 and may be controlled by the controller 77. The driving force may not be transmitted to the auxiliary wheel 83, and the auxiliary wheel may serve to assist the traveling of the driving part 80.

The controller 77 may individually control each of the driving wheels 82. A rotation direction and rotation rate of each of the driving wheel 82 may be differently controlled so that the air conditioning robot 6 travels and rotates in various directions.

The driving wheel 82 may include at least one of a main wheel 85, an auxiliary wheel 87, a motor 84, a gear part 86, or a clutch member 88.

The main wheel 85 may have a circular shape, and a plurality of grooves may be defined in an outer surface of the main wheel 85. A hole may be defined in a central portion of the main wheel 85.

Frictional force provided by a surface shape of the auxiliary wheel 87 may be greater than that provided by a surface shape of the main wheel 85. A diameter of the auxiliary wheel 87 may be less than that of the main wheel 85.

The motor 84 may generate driving force, and the main wheel 85 may receive the driving force generated by the motor 84 through the gear part 86.

The gear part 86 may be connected to the main wheel 85 and the motor 84 to transmit the driving force of the motor 84 to the main wheel 85. The gear part 86 may include a shaft connected to each of the motor 84 and the main wheel 85, and the gear part 86 may be installed so that a plurality of gears are engaged with each other in the gear part 86 to transmit the driving force generated from the motor 84 to the main wheel 85.

The clutch member 88 may be connected to the auxiliary wheel 87 and the gear part 86 and may transmit the driving force of the motor 84 to the auxiliary wheel 87. For example, the clutch member 88 may be provided as a magnetic clutch. The magnetic clutch may include a solenoid and may transmit driving force to the auxiliary wheel 87 by using magnetic force generated in the solenoid.

For another example, the clutch member 88 may receive a control signal related to an operation of the clutch member from the controller 77. The clutch member 88 may distribute power of the main wheel 85 into the auxiliary wheel 87.

When the clutch member 88 is in a turn-on state, the clutch member 88 may be rotatable and change a position of the auxiliary wheel 87.

When the air conditioning robot 6 travels normally, the clutch member 88 may be turned off, and the auxiliary wheel 87 may not contact the ground or an obstacle. On the other hand, when the main wheel 85 of the air conditioning robot 6 is in an idle state or restricted by an obstacle, the clutch member 88 may be turned on, and the auxiliary wheel 87 may be in a state of contacting the ground or the obstacle.

The controller 77 may control an operation of the clutch member 88 based on information related to the obstacle. Here, the information related to the obstacle may include information related to a distance between the obstacle and the main body, a height of the obstacle, an inclined surface, a shape, a surface, and the like. For example, when the height of the obstacle placed on the traveling direction of the air conditioning robot 6 is greater than or equal to a predetermined height value, the controller may turn on the clutch member 88 to control the driving part 80 so that the auxiliary wheel 87 contacts the obstacle.

Thus, even if the main wheel 85 is in the idle state or restricted by the obstacle while the air conditioning robot 6 travels, the auxiliary wheel 87 may be driven to be escaped from the idle or restriction state.

Figure 6:
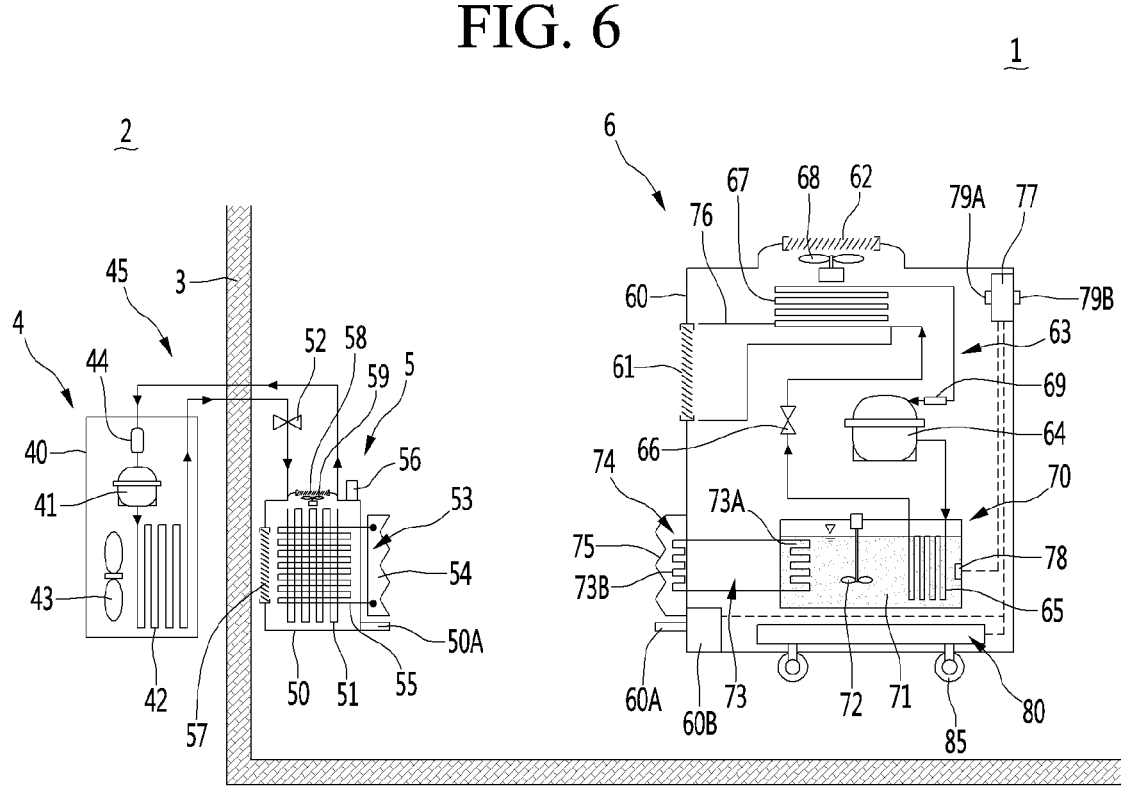
FIG. 6 is a view illustrating a configuration of an air conditioning system according to a second embodiment of the present disclosure.

FIG. 6 is a view illustrating a configuration of an air conditioning system according to a second embodiment of the present disclosure.

Hereinafter, contents duplicated with the foregoing first embodiment will be omitted, and differences will be mainly described.

In a heat transfer terminal 5 of an air conditioning system according to this embodiment, a terminal suction hole and a terminal discharge hole 58 may be defined in a terminal body 50. Also, the heat transfer terminal 5 may further include a terminal blower fan 59 disposed in the terminal body 50.

The terminal blower fan 59 may blow air suctioned into the terminal suction hole 57 so as to be heat-exchanged with a first evaporator 51, thereby discharging the air to the terminal discharge hole 58. That is, in the first evaporator 51, a refrigerant may be evaporated by heat of a heat absorption part 53 and also evaporated by being heat-exchanged with air blown by the terminal blower fan 59.

A controller 77 may turn off the terminal blower fan 59 when the heat absorption part 53 of the heat transfer terminal 5 and the heat dissipation part 74 of the air conditioning robot 6 thermally contact each other.

On the other hand, the controller 77 may turn on the terminal blower fan 59 in a state in which the heat absorption part 53 of the heat transfer terminal 5 and the heat dissipation part 74 of the air conditioning robot 6 are separated from each other. Here, the controller 77 may control the refrigerant to be circulated along a cooling cycle 45 for heat dissipation by turning on the first compressor 41 even when the heat absorption part 53 and the heat dissipation part 74 are separated from each other. Thus, cool cold wind may be discharged from the terminal discharge hole 58 of the heat transfer terminal 5 to cool an air conditioning space 1.

That is, the heat transfer terminal 5 of the air conditioning system according to this embodiment has an advantage of performing cooling of the air conditioning space 1 as well as the heat dissipation of the air conditioning robot 6. For example, the air conditioning robot 6 may perform intensive cooling while tracking a user, and the heat transfer terminal 5 may perform overall cooling to cool the air conditioning space 1 as a whole.

The heat transfer terminal 5 of the air conditioning system according to this embodiment may be provided with a power supply terminal 50A for supplying power, and the air conditioning robot 6 may be provided with a charging terminal 60A connected to the power supply terminal 50A when the heat dissipation part 74 and the heat absorption part 53 thermally contact each other.

The charging terminal 60A of the air conditioning robot 6 may be connected to a battery 60B provided in the above-described power supply part 130 (see FIG. 3). When the charging terminal 60A is connected to the power supply terminal 50A of the heat transfer terminal 5, the battery 60B may be charged.

When the heat dissipation part 74 thermally contacts the heat absorption part 53 of the heat transfer terminal 5 to dissipate heat of the air conditioning robot 6, the charging terminal 60A of the air conditioning robot 5 may be connected to the power supply terminal 50A of the heat transfer terminal 5. Thus, the heat dissipation of a heat storage tank 70 of the air conditioning robot 5 and the charging of the battery 60B may be performed as the same time. That is, the heat transfer terminal 5 according to this embodiment may serve as a charging stand. Thus, a separate charging stand may not be required to simplify the configuration of the air conditioning system.

Figure 7:
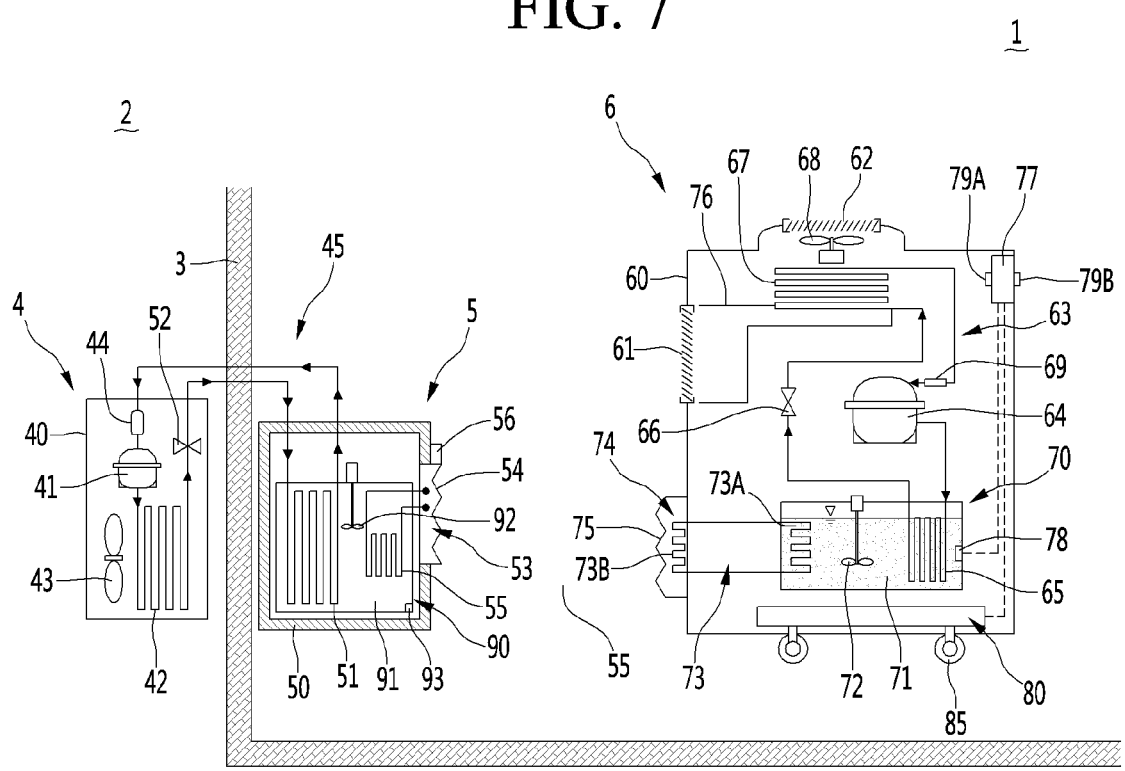
FIG. 7 is a view illustrating a configuration of an air conditioning system according to a third embodiment of the present disclosure.

FIG. 7 is a view illustrating a configuration of an air conditioning system according to a third embodiment of the present disclosure.

Hereinafter, contents duplicated with the foregoing first embodiment will be omitted, and differences will be mainly described.

A heat transfer terminal 5 of an air conditioning system according to this embodiment may further include a terminal heat storage tank 90 in which heat transferred to a heat absorption part 54 is stored, and a heat storage material 91 that is heat-exchanged with a first evaporator 51 is accommodated.

That is, unlike the foregoing first embodiment, the heat transfer terminal 5 according to this embodiment may be heated-exchanged by using the heat storage material 91 as a medium without being directly heat-exchanged between a heat absorption part 53 and a first evaporator 51. The heat storage material 91 may be called a heat transfer buffer.

In more detail, a terminal heat pipe 55 connected to the heat absorption part 53 may be connected to the terminal heat storage tank 90 to contact the heat storage material 91, and heat of the heat absorption part 53 that thermally contacts the heat dissipation part 74 of the air conditioning robot 6 may be transferred to the heat storage material 91 through the terminal heat pipe 55. The first evaporator 51 may be disposed in the terminal heat storage tank 90 so that at least a portion of the first evaporator 51 contacts the heat storage material 91, and a refrigerant passing through the first evaporator 51 is evaporated by the heat stored in the heat storage material 91.

A terminal body 50 may include a heat insulation case. The heat insulation case may be disposed to surround the terminal heat storage tank 90 to prevent the heat stored in the terminal heat storage tank 90 from being released to an air conditioning space 1.

The terminal heat storage tank 90 may be provided with an agitator 92. The agitator 92 may agitate the heat storage material 91 to promote convective heat transfer in the terminal heat storage tank 90. The agitator 92 may be controlled by a controller 77.

The terminal heat storage tank 90 may be provided with a terminal temperature sensor 93. The terminal temperature sensor 93 may measure a temperature of the terminal heat storage tank 90. As an amount of heat stored in the heat storage material 91 increases, the measured temperature of the terminal temperature sensor 93 may increase. When the measured temperature of the terminal temperature sensor 93 becomes higher than a preset terminal heat dissipation setting temperature, this may mean that a heat storage level of the terminal heat storage tank 90 reaches a heat storage limit. On the contrary, when a cooling cycle for the heat dissipation operates to release the heat stored in the heat storage material 91, the measured temperature of the terminal temperature sensor 93 may decrease. When the measured temperature of the terminal temperature sensor 93 decreases lower than a predetermined terminal heat dissipation release setting temperature, this may mean that the heat storage level of the terminal heat storage tank 90 is sufficiently lowered.

When the measured temperature of the terminal temperature sensor 93 is greater than the terminal heat dissipation setting temperature, the controller 77 may turns on a first compressor 41 and an outdoor fan 43 to cool a refrigerant so that the refrigerant is circulated along the heat dissipation cooling cycle 45.

The controller 77 may turn off the first compressor 41 and the outdoor fan 43 when the measured temperature of the terminal temperature sensor 93 is less than the terminal heat dissipation release setting temperature.

Thus, the cooling cycle 45 for the heat dissipation may have an advantage in easily performing the heat dissipation even though the heat dissipation part 74 of the air conditioning robot 6 and the heat dissipation part 53 of the heat transfer terminal 5 are not driven whenever the heat dissipation part 74 and the heat dissipation part 53 thermally contact each other and also in reducing energy consumption.

The heat absorption part 53 of the heat transfer terminal 5 may be provided in plurality, and each of the heat dissipation parts 74 of the plurality of air conditioning robots 6 may thermally contact each of the heat absorption parts 53. That is, a single heat transfer terminal 5 may perform the heat dissipation of the plurality of air conditioning robots 6. Such a configuration may also be applied to the first embodiment. However, there is a concern that a time consumed for the heat dissipation may increase when performing the heat dissipation of the plurality of air conditioning robots 6 at the same time.

On the other hand, in this embodiment, since the heat storage material 91 serves as the heat transfer buffer, the heat transferred from the air conditioning robot 6 may preferentially be stored in the terminal heat storage tank 90. That is, the time consumed for the heat dissipation of the plurality of air conditioning robots 6 may be reduced.

Figure 8:
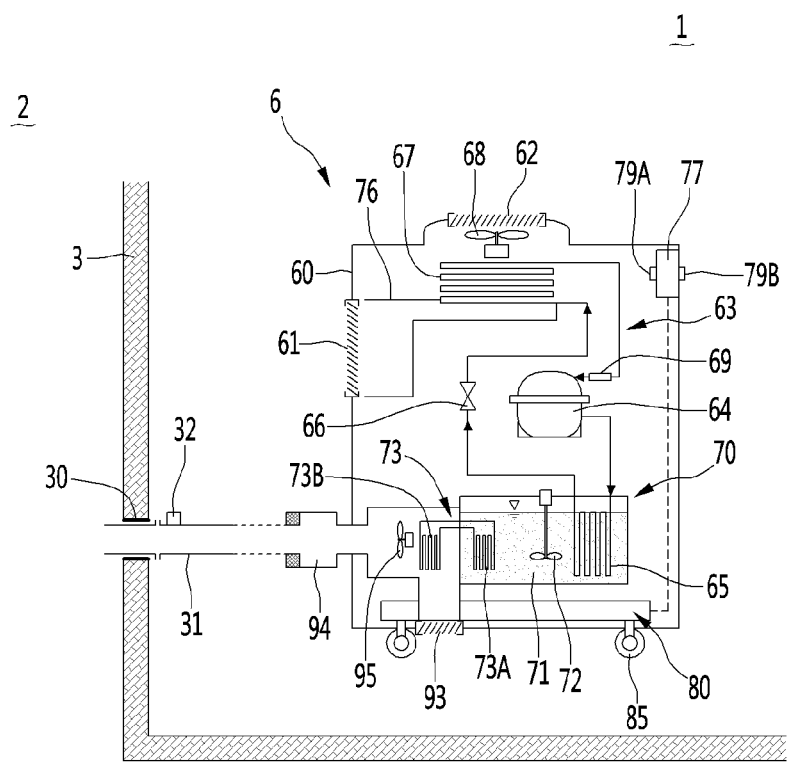
FIG. 8 is a view illustrating a configuration of an air conditioning system according to a fourth embodiment of the present disclosure.

FIG. 8 is a view illustrating a configuration of an air conditioning system according to a fourth embodiment of the present disclosure.

Hereinafter, contents duplicated with the foregoing first embodiment will be omitted, and differences will be mainly described.

An air conditioning system according to this embodiment may not include the outdoor unit 4 (see FIG. 2) and the heat transfer terminal 5 (see FIG. 2), and a heat dissipation duct 30 may be provided in an installation wall 3. The heat dissipation duct 30 may allow an air conditioning space 1 to communicate with an outdoor space 2.

An opening and closing member (not shown) that selectively opens and closes the heat dissipation duct 30 may be provided in the heat dissipation duct 30. The opening and closing member may be opened in a state in which a heat dissipation discharge part 94, which will be described later, of the air conditioning robot 5 is connected to the heat dissipation duct 30 and may be closed in a state of being separated from the heat dissipation duct 30.

The air conditioning robot 6 may perform heat dissipation of a heat storage tank 70 through the heat dissipation duct 30.

In more detail, the air conditioning robot 6 may include a heat dissipation fan 95 and the heat dissipation discharge unit 94 instead of the heat dissipation part 74 (see FIG. 2).

The heat dissipation fan 95 may be disposed toward a low temperature portion 73B of a heat pipe 73. The air blown by the heat dissipation fan 95 may be heat-exchanged with the low temperature portion 73B of the heat pipe 73. That is, heat stored in the heat storage tank 70 may be transferred from a high temperature portion 73A of the heat pipe 73 to the low temperature portion 73B, and the heat of the low temperature portion 73B may be cooled by the air blown by the heat dissipation fan 95.

A heat dissipation suction hole 93 may be defined in a main body 60 of the air conditioning robot 6. The heat dissipation suction hole 93 may be defined to be spaced apart from the suction hole 61 and the discharge hole 62.

The heat dissipation fan 95 may suction air into the heat dissipation suction hole 93. The suctioned air may be guided through a duct inside the body 10 to the low temperature portion 73B of the heat pipe 73 so as to be heat-exchanged, and the heat-exchanged air may be discharged to the heat dissipation discharge part 94. That is, the air blown by the heat dissipation fan 95 may be discharged to the heat dissipation discharge part 94. Here, the heat dissipation discharge part 94 may be in a state of being connected to the duct connecting portion 31 that will be described later, and the air discharged from the heat dissipation discharge part 94 may sequentially pass through a duct connection part 31 and the heat dissipation duct 30 and be discharged to the outside. As a result, the heat stored in the heat storage tank 70 of the air conditioning robot 6 may be released to the outside.

However, the heat dissipation suction hole 93 may not be defined in the main body 60 of the air conditioning robot 6, and the air suctioned through the suction hole 61 may be blown by the heat dissipation fan so as to be heat-exchanged with the low temperature portion 73B of the heat pipe 73.

The heat dissipation discharge part 94 may protrude to the outside of the main body 60 of the air conditioning robot 6. The heat dissipation discharge part 94 may be directly connected to the heat dissipation duct 30 of the installation wall 3 or may be connected to the heat dissipation duct 30 through the duct connection part 31. Hereinafter, a case in which the heat dissipation discharge part 94 is connected to the duct connection part 31 will be described as an example.

At least one of the duct connection part 31 or the heat dissipation discharge part 94 may be provided with a connection detection sensor that detects the connection between the duct connection part 31 or the heat dissipation discharge part 94.

A driving part 80 may allow the air conditioning robot 6 to move away from the duct connection part 31, thereby separating the heat dissipation discharge part 94 from the duct connection part 31. On the contrary, the driving part 80 may allow the air conditioning robot 6 to move toward the duct connection part 31, thereby connecting the heat dissipation discharge part 94 to the duct connection part 31.

The external signal detection sensor 79A of the air conditioning robot 6 may detect or receive a signal transmitted from a position signal generation device 32 of the duct connection part 31, and the controller 77 may recognize a position and direction of the duct connection part 31 by the signal detected by the external signal detection sensor 79A. That is, the controller 77 may determine a current position of the air conditioning robot 6 and set a moving direction by the signal transmitted from the position signal generation device 32. In addition, the controller 77 may control the driving part 80 to allow the air conditioning robot 6 to move to the duct connection part 31. Also, a controller 77 may turn on the heat dissipation fan 95 while the heat dissipation discharge part 94 and the duct connecting part 31 are connected to each other.

In conclusion, the air conditioning system according to this embodiment may directly blow high-temperature air to the door space to dissipate the heat, and thus, the configuration of the air conditioning system may be more simplified when compared to the air conditioning systems according to the first to third embodiments.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the disclosure but by the appended claims, and all differences within the scope will be construed as being included in the present disclosure.

The invention claimed is:

1. An air conditioning robot comprising:
a main body having a suction hole and a discharge hole;
a cooling cycle comprising a compressor, a condenser, an expansion valve, and an evaporator, which are disposed within the main body;
a blower fan configured to blow air suctioned through the suction hole so that the air is heat-exchanged with the evaporator and discharged through the discharge hole;
a heat storage tank configured to accommodate a heat storage material in which heat of the condenser is stored;
a heat dissipation part configured to dissipate the heat of the heat storage material accommodated in the heat storage tank, the heat dissipation part thermally contacting a heat transfer terminal disposed outside the main body; and
a driving part configured to allow the main body to move so that the heat dissipation part thermally contacts or is thermally separated from the heat transfer terminal,
wherein the air conditioning robot further comprises:
a temperature sensor disposed in the heat storage tank; and
a controller configured to control the driving part so that the heat dissipation part thermally contacts a heat absorption part when a temperature measured by the temperature sensor is higher than a preset temperature.

2. The air conditioning robot according to claim I, further comprising a heat pipe that is connected to each of the heat storage tank and the heat dissipation part to transfer the heat stored in the heat storage tank to the heat dissipation part.

3. The air conditioning robot according to claim 1, further comprising:
a human recognition sensor configured to recognize a position of a human; and
a controller configured to control the driving part so as to receive a signal of the human recognition sensor, thereby tracing a moving path of the human.

4. The air conditioning robot according to claim i wherein the heat dissipation part is disposed on an outer surface of the main body.

5. An air conditioning system comprising:
an outdoor unit comprising a first compressor and a first condenser:
a heat transfer terminal comprising a first evaporator connected to the first compressor and the first condenser and a heat absorption part that is heat-exchanged with the first evaporator; and
an air conditioning robot that separably thermally contacts the heat absorption part of the heat transfer terminal,
wherein the air conditioning robot comprises:
a main body having a suction hole and a discharge hole;
a cooling cycle comprising a second compressor, a second condenser, a second expansion valve, and a second evaporator, which are disposed within the main body;
a blower fan configured to blow air suctioned through the suction hole so that the air is heat-exchanged with the second evaporator and discharged through the discharge hole;

a heat storage tank configured to accommodate a heat storage material in which heat of the second condenser is stored;

a heat dissipation part configured to dissipate the heat of the heat storage material accommodated in the heat storage tank, the heat dissipation part thermally contacting the heat absorption part; and a driving part configured to allow the main body to move so that the heat dissipation part thermally contacts or is thermally separated from the heat absorption part.

6. The air conditioning system according to claim 5, wherein a power supply terminal configured to supply power is provided on the heat transfer terminal, and a charging terminal connected to the power supply terminal when the heat dissipation part thermally contacts the heat absorption part is provided on the air conditioning robot.

7. The air conditioning system according to claim 5, wherein the air conditioning robot further comprises a heat pipe that is connected to each of the heat storage tank and the heat dissipation part to transfer the heat stored in the heat storage tank to the heat dissipation part.

8. The air conditioning system according to claim 5, wherein the air conditioning robot further comprises:

a temperature sensor disposed in the heat storage tank; and a controller configured to control the driving part so that the heat dissipation part thermally contacts the heat absorption part when a temperature measured by the temperature sensor is higher than a preset temperature.

9. The air conditioning system according to claim 8, wherein the controller turns on the first compressor when the heat absorption part contacts the heat dissipation part.

10. The air conditioning system according to claim 5, wherein a signal generator is provided in the heat transfer terminal, and an external signal detection sensor configured to receive a signal transmitted from the signal generator is provided in the air conditioning robot.

11. The air conditioning system according to claim 5, wherein the heat transfer terminal further comprises:

a terminal body in which the first evaporator is disposed, the terminal body having a terminal suction hole and a terminal discharge hole; and a terminal blower fan configured to blow air suctioned through the terminal suction hole so that the air is heat-exchanged with the first evaporator and discharged through the terminal discharge hole.

12. The air conditioning system according to claim 5, wherein the heat transfer terminal further comprises a terminal heat pipe connected to each of the heat absorption part and the first evaporator to transfer heat of the absorption part to the first evaporator.

13. The air conditioning system according to claim 5, wherein the heat transfer terminal further comprises:

a terminal heat pipe connected to the heat absorption part; and a terminal heat storage tank in which heat transferred to the terminal heat pipe is stored, the terminal heat storage tank being configured to accommodate a heat storage material that is heat-exchanged with the first evaporator.

14. The air conditioning system according to claim 13, wherein the heat absorption part is provided in plurality.

15. The air conditioning system according to claim 13, wherein the heat transfer terminal further comprises a. heat insulation case that surrounds the terminal heat storage tank.

16. The air conditioning system according to claim 5, wherein a first uneven part is disposed on the heat absorption part, and a second uneven part which contacts the first uneven part when the heat absorption part contacts the heat dissipation part and has a shape corresponding to that of the first uneven part is disposed on the heat dissipation part.

17. The air conditioning system according to claim 5, wherein the heat absorption part is disposed in an air conditioning space in which the air conditioning robot is disposed.

18. An air conditioning robot comprising:

a main body having a suction hole and a discharge hole;

a cooling cycle comprising a compressor, a condenser, an expansion valve, and an evaporator, which are disposed within the main body;

a blower fan configured to blow air suctioned through the suction hole so that the air is heat-exchanged with the evaporator and discharged through the discharge hole;

a heat storage tank configured to accommodate a heat storage material in which heat of the condenser is stored;

a heat pipe having a high temperature portion that contacts the heat storage material accommodated in the heat storage tank and a low temperature portion to which heat of the high temperature portion is transferred;

a heat dissipation fan configured to blow air so that the air is heat-exchanged with the low temperature portion;

a heat dissipation discharge part through which the air blown by the heat dissipation fan is discharged, the heat dissipation discharge part being separably connected to a heat dissipation duct configured to allow an air conditioning space to communicate with an outdoor space; and a driving part configured to allow the main body to move so that the heat dissipation discharge part is connected to or separated from the heat dissipation duct.

19. The air conditioning robot according to claim 18, wherein a heat dissipation suction hole which is spaced apart from the suction hole and the discharge hole and through which the air is suctioned by the heat dissipation fan is defined in the main body.

* * * * *